US007928338B2

(12) United States Patent
Suslov (10) Patent No.: US 7,928,338 B2
(45) Date of Patent: Apr. 19, 2011

(54) PLASMA SPRAYING DEVICE AND METHOD (75) Inventor: Nikolay Suslov, Västra Frölundna (SE)

(73) Assignee: Plasma Surgical Investments Ltd., Tortola (VG)

( * ) Notice: Subject to any disclaimer, the term of this patent is extended or adjusted under 35 U.S.C. 154(b) by 0 days.

(21) Appl. No.: 11/701,911

(22) Filed: Feb. 2, 2007

(65) Prior Publication Data
US 2008/0185366 A1 Aug. 7, 2008

(51) Int. Cl.
B23K 10/00 (2006.01)
(52) U.S. Cl. .......... 219/121.47; 219/76.16; 219/121.51; 219/121.48; 219/121.52; 219/75; 313/231.31
(58) Field of Classification Search ............. 219/121.36, 219/121.48, 121.52, 121.51, 121.47, 121.37, 219/76.15, 76.16, 121.5, 121.59, 74, 75; 313/231.31, 231.41
See application file for complete search history.

(56) References Cited

U.S. PATENT DOCUMENTS

| 3,077,108 A | 2/1963 | Gage et al. |
| 3,082,314 A | 3/1963 | Yoshiaki et al. |
| 3,100,489 A | 8/1963 | Bagley |
| 3,145,287 A | 8/1964 | Seibein et al. |
| 3,153,133 A | 10/1964 | Ducati |
| 3,270,745 A | 9/1966 | Wood |
| 3,360,988 A | 1/1968 | Stein et al. |
| 3,413,509 A | 11/1968 | Cann et al. |
| 3,433,991 A | 3/1969 | Whyman |
| 3,434,476 A | 3/1969 | Shaw et al. |
| 3,534,388 A | 10/1970 | Osamu et al. |
| 3,628,079 A | 12/1971 | Dobbs et al. |
| 3,676,638 A | 7/1972 | Stand |
| 3,775,825 A | 12/1973 | Wood et al. |
| 3,803,380 A | 4/1974 | Ragaller |
| 3,838,242 A | 9/1974 | Goucher |
| 3,851,140 A | 11/1974 | Coucher |

(Continued)

FOREIGN PATENT DOCUMENTS
AU 2000250426 6/2005
(Continued)

OTHER PUBLICATIONS

PCT International Search Report dated Feb. 14, 2007, International App. No. PCT/EP2006/006688.

(Continued)

Primary Examiner — Mark H Paschall
(74) Attorney, Agent, or Firm — Jones Day (57) ABSTRACT A device and a method for plasma spraying are disclosed. The device comprises, a cathode, an anode, a plasma channel formed by the anode and intermediate electrodes, and one or more flowable material injectors. The plasma channel has a throttling portion that divides the plasma channel into a high pressure portion near the cathode formed by at least one intermediate electrode and a low pressure portion near the anode. During operation, a plasma generating gas is heated by the arc maintained between the cathode and the anode, forming plasma. When the plasma passes through the throttling portion, its speed increases to a supersonic speed, and at the same time its static pressure drops. Flowable materials are injected in the plasma flow in the low pressure portion. The particles in the flowable materials are heated by the plasma and the resultant heated particles and plasma are output from the outlet of the plasma channel.

25 Claims, 5 Drawing Sheets

U.S. PATENT DOCUMENTS

| | | |
|---|---|---|
| 3,866,089 A | 2/1975 | Hengartner |
| 3,903,891 A | 9/1975 | Brayshaw |
| 3,914,573 A | 10/1975 | Muehlberger |
| 3,938,525 A | 2/1976 | Coucher |
| 3,991,764 A | 11/1976 | Incropera et al. |
| 4,029,930 A | 6/1977 | Sagara et al. |
| 4,035,684 A | 7/1977 | Svoboda et al. |
| 4,041,952 A | 8/1977 | Morrison, Jr. et al. |
| 4,201,314 A | 5/1980 | Samuels et al. |
| 4,256,779 A | 3/1981 | Sokol et al. |
| 4,317,984 A | 3/1982 | Fridlyand |
| 4,397,312 A | 8/1983 | Molko |
| 4,445,021 A | 4/1984 | Irons et al. |
| 4,661,682 A | 4/1987 | Gruner et al. |
| 4,672,163 A | 6/1987 | Matsui et al. |
| 4,674,683 A | 6/1987 | Fabel |
| 4,682,598 A | 7/1987 | Beraha |
| 4,696,855 A | 9/1987 | Pettit, Jr. et al. |
| 4,711,627 A | 12/1987 | Oeschsle et al. |
| 4,713,170 A | 12/1987 | Saibic |
| 4,743,734 A | 5/1988 | Garlanov et al. |
| 4,764,656 A | 8/1988 | Browning |
| 4,777,949 A | 10/1988 | Perlin |
| 4,780,591 A | 10/1988 | Bernecki et al. |
| 4,781,175 A | 11/1988 | McGreevy et al. |
| 4,784,321 A | 11/1988 | Delaplace |
| 4,785,220 A | 11/1988 | Brown et al. |
| 4,839,492 A | 6/1989 | Bouchier et al. |
| 4,841,114 A | 6/1989 | Browning |
| 4,853,515 A | 8/1989 | Willen et al. |
| 4,855,563 A | 8/1989 | Beresnev et al. |
| 4,866,240 A | 9/1989 | Webber |
| 4,869,936 A | 9/1989 | Moskowitz et al. |
| 4,874,988 A | 10/1989 | English |
| 4,877,937 A | 10/1989 | Muller |
| 4,916,273 A | 4/1990 | Browning |
| 4,924,059 A | 5/1990 | Rotolico et al. |
| 5,008,511 A | 4/1991 | Ross |
| 5,013,883 A | 5/1991 | Fuimefreddo et al. |
| 5,100,402 A | 3/1992 | Fan |
| 5,144,110 A | 9/1992 | Marantz et al. |
| 5,151,102 A | 9/1992 | Kamiyama et al. |
| 5,201,900 A | 4/1993 | Nardella |
| 5,207,691 A | 5/1993 | Nardella |
| 5,211,646 A | 5/1993 | Alperovich et al. |
| 5,217,460 A | 6/1993 | Knoepfler |
| 5,225,652 A | 7/1993 | Landes |
| 5,227,603 A | 7/1993 | Doolette et al. |
| 5,261,905 A | 11/1993 | Doresey |
| 5,285,967 A | 2/1994 | Weidman |
| 5,332,885 A | 7/1994 | Landes |
| 5,352,219 A | 10/1994 | Reddy |
| 5,396,882 A | 3/1995 | Zapol |
| 5,403,312 A | 4/1995 | Yates et al. |
| 5,406,046 A | 4/1995 | Landes |
| 5,408,066 A | 4/1995 | Trapani et al. |
| 5,412,173 A | 5/1995 | Muehlberger |
| 5,445,638 A | 8/1995 | Rydell et al. |
| 5,452,854 A | 9/1995 | Keller |
| 5,460,629 A | 10/1995 | Shlain et al. |
| 5,485,721 A | 1/1996 | Steenborg |
| 5,514,848 A | 5/1996 | Ross et al. |
| 5,519,183 A | 5/1996 | Mueller |
| 5,527,313 A | 6/1996 | Scott et al. |
| 5,573,682 A | 11/1996 | Beason, Jr. |
| 5,582,611 A | 12/1996 | Tsuruta et al. |
| 5,620,616 A | 4/1997 | Anderson et al. |
| 5,629,585 A | 5/1997 | Altmann |
| 5,637,242 A | 6/1997 | Muehlberger |
| 5,640,843 A | 6/1997 | Aston |
| 5,662,680 A | 9/1997 | Desai |
| 5,665,085 A | 9/1997 | Nardella |
| 5,679,167 A | 10/1997 | Muehlberger |
| 5,680,014 A | 10/1997 | Miyamoto et al. |
| 5,688,270 A | 11/1997 | Yates et al. |
| 5,697,281 A | 12/1997 | Eggers et al. |
| 5,702,390 A | 12/1997 | Austin et al. |
| 5,720,745 A | 2/1998 | Farin et al. |
| 5,733,662 A | 3/1998 | Bogachek |
| 5,797,941 A | 8/1998 | Schulze et al. |
| 5,827,271 A | 10/1998 | Buysse et al. |
| 5,833,690 A | 11/1998 | Yates et al. |
| 5,837,959 A | 11/1998 | Muehlberger et al. |
| 5,843,079 A | 12/1998 | Suslov |
| 5,858,469 A | 1/1999 | Sahoo et al. |
| 5,858,470 A | 1/1999 | Bernecki et al. |
| 5,897,059 A | 4/1999 | Muller |
| 5,932,293 A | 8/1999 | Belashchenko et al. |
| 6,003,788 A | 12/1999 | Sedov |
| 6,042,019 A | 3/2000 | Rusch |
| 6,099,523 A | 8/2000 | Kim et al. |
| 6,114,649 A | 9/2000 | Delcea |
| 6,135,998 A | 10/2000 | Palanker |
| 6,137,078 A | 10/2000 | Keller |
| 6,137,231 A | 10/2000 | Anders |
| 6,162,220 A | 12/2000 | Nezhat |
| 6,169,370 B1 | 1/2001 | Platzer |
| 6,181,053 B1 | 1/2001 | Roberts |
| 6,202,939 B1 | 3/2001 | Delcea |
| 6,273,789 B1 | 8/2001 | LaSalle et al. |
| 6,283,386 B1 | 9/2001 | Van Steenkiste et al. |
| 6,352,533 B1 | 3/2002 | Ellman et al. |
| 6,386,140 B1 | 5/2002 | Muller et al. |
| 6,392,189 B1 | 5/2002 | Delcea |
| 6,418,874 B1 * | 7/2002 | Cox et al. .................... 118/723 I |
| 6,443,948 B1 | 9/2002 | Suslov |
| 6,475,215 B1 | 11/2002 | Tanrisever |
| 6,514,252 B2 | 2/2003 | Nezhat et al. |
| 6,515,252 B1 | 2/2003 | Girold |
| 6,528,947 B1 | 3/2003 | Chen et al. |
| 6,548,817 B1 | 4/2003 | Anders |
| 6,562,037 B2 | 5/2003 | Paton et al. |
| 6,629,974 B2 | 10/2003 | Penny et al. |
| 6,657,152 B2 | 12/2003 | Shimazu |
| 6,669,106 B2 | 12/2003 | Delcea |
| 6,676,655 B2 | 1/2004 | McDaniel et al. |
| 6,780,184 B2 | 8/2004 | Tanrisever |
| 6,845,929 B2 | 1/2005 | Dolatabadi et al. |
| 6,886,757 B2 | 5/2005 | Byrnes et al. |
| 6,958,063 B1 | 10/2005 | Soll et al. |
| 6,972,138 B2 | 12/2005 | Heinrich et al. |
| 6,986,471 B1 | 1/2006 | Kowalsky et al. |
| 7,025,764 B2 | 4/2006 | Paton et al. |
| 7,030,336 B1 | 4/2006 | Hawley |
| 7,118,570 B2 | 10/2006 | Tetzlaff et al. |
| 7,589,473 B2 | 9/2009 | Suslov |
| 2001/0041227 A1 | 11/2001 | Hislop |
| 2002/0013583 A1 | 1/2002 | Camran et al. |
| 2002/0071906 A1 | 6/2002 | Rusch |
| 2002/0091385 A1 | 7/2002 | Paton et al. |
| 2002/0097767 A1 | 7/2002 | Krasnov |
| 2003/0030014 A1 | 2/2003 | Wieland et al. |
| 2003/0040744 A1 | 2/2003 | Latterell et al. |
| 2003/0075618 A1 | 4/2003 | Shimazu |
| 2003/0114845 A1 | 6/2003 | Paton et al. |
| 2003/0125728 A1 | 7/2003 | Nezhat et al. |
| 2003/0178511 A1 | 9/2003 | Dolatabadi et al. |
| 2003/0190414 A1 | 10/2003 | Van Steenkiste |
| 2004/0018317 A1 | 1/2004 | Heinrich et al. |
| 2004/0064139 A1 | 4/2004 | Yossepowitch |
| 2004/0068304 A1 | 4/2004 | Paton et al. |
| 2004/0116918 A1 | 6/2004 | Konesky |
| 2004/0124256 A1 | 7/2004 | Itsukaichi et al. |
| 2004/0129222 A1 | 7/2004 | Nylen et al. |
| 2004/0195219 A1 | 10/2004 | Conway |
| 2005/0082395 A1 | 4/2005 | Gardega |
| 2005/0120957 A1 | 6/2005 | Kowalsky et al. |
| 2005/0192610 A1 | 9/2005 | Houser et al. |
| 2005/0192611 A1 | 9/2005 | Houser |
| 2005/0192612 A1 | 9/2005 | Houser et al. |
| 2005/0234447 A1 | 10/2005 | Paton et al. |
| 2005/0255419 A1 | 11/2005 | Belashchenko et al. |
| 2006/0004354 A1 | 1/2006 | Suslov |
| 2006/0037533 A1 | 2/2006 | Belashchenko et al. |
| 2006/0049149 A1 | 3/2006 | Shimazu |
| 2006/0090699 A1 | 5/2006 | Muller |
| 2006/0091116 A1 | 5/2006 | Suslov |

| | | | |
|---|---|---|---|
| 2006/0091117 | A1 | 5/2006 | Blankenship et al. |
| 2006/0091119 | A1 | 5/2006 | Zajchowski et al. |
| 2006/0108332 | A1 | 5/2006 | Belashchenko |
| 2006/0217706 | A1 | 9/2006 | Lau et al. |
| 2006/0287651 | A1 | 12/2006 | Bayat |
| 2007/0021747 | A1 | 1/2007 | Suslov |
| 2007/0021748 | A1 | 1/2007 | Suslov |
| 2007/0029292 | A1 | 2/2007 | Suslov |
| 2007/0038214 | A1 | 2/2007 | Morley et al. |
| 2007/0138147 | A1 | 6/2007 | Molz et al. |
| 2007/0173871 | A1 | 7/2007 | Houser et al. |
| 2007/0173872 | A1 | 7/2007 | Neuenfeldt |
| 2007/0191828 | A1 | 8/2007 | Houser et al. |
| 2008/0015566 | A1 | 1/2008 | Livneh |
| 2008/0071206 | A1 | 3/2008 | Peters |
| 2008/0114352 | A1 | 5/2008 | Long et al. |
| 2009/0039789 | A1 | 2/2009 | Suslov |
| 2009/0039790 | A1 | 2/2009 | Suslov |

FOREIGN PATENT DOCUMENTS

| | | |
|---|---|---|
| AU | 2006252145 | 1/2007 |
| CA | 983586 | 2/1976 |
| CA | 1 144 104 | 4/1983 |
| CA | 1308722 | 10/1992 |
| CA | 2594515 | 7/2006 |
| CN | 1557731 | 12/2004 |
| DE | 2033072 | 2/1971 |
| DE | 10127261 | 9/1993 |
| DE | 4209005 | 12/2002 |
| EP | 0411170 | 2/1991 |
| EP | 0748149 | 12/1996 |
| EP | 0851040 | 7/1998 |
| EP | 1293169 | 3/2003 |
| EP | 1570798 | 9/2005 |
| ES | 2026344 | 4/1992 |
| FR | 2 193 299 | 2/1974 |
| FR | 2 567 747 | 1/1986 |
| FR | 2567747 | 1/1986 |
| GB | 751735 | 7/1956 |
| GB | 921016 | 3/1963 |
| GB | 1 125 806 | 9/1968 |
| GB | 1 176 333 | 1/1970 |
| GB | 1 268 843 | 3/1972 |
| GB | 2 407 050 | 4/2005 |
| JP | 62123004 | 6/1987 |
| JP | 1198539 | 8/1989 |
| JP | 3 043 678 | 2/1991 |
| JP | 9299380 | 11/1997 |
| JP | 10024050 | 1/1998 |
| JP | 10234744 | 9/1998 |
| JP | 2008036001 | 2/2008 |
| MX | PA04010281 | 6/2005 |
| RU | 2178684 | 1/2002 |
| RU | 2183480 | 6/2002 |
| RU | 2183946 | 6/2002 |
| WO | WO9219166 | 11/1992 |
| WO | WO 96/06572 | 3/1996 |
| WO | WO9711647 | 4/1997 |
| WO | WO0162169 | 8/2001 |
| WO | WO0230308 | 4/2002 |
| WO | WO 03/28805 | 4/2003 |
| WO | WO 2004/028221 | 4/2004 |
| WO | WO 2004/030551 | 4/2004 |
| WO | WO 2004/105450 | 12/2004 |
| WO | WO 2005/099595 | 10/2005 |
| WO | WO 2006/012165 | 2/2006 |
| WO | WO 2007/003157 | 1/2007 |
| WO | WO 2007/006516 | 1/2007 |
| WO | WO 2007/006517 | 1/2007 |
| WO | WO 2007/040702 | 4/2007 |

OTHER PUBLICATIONS

PCT Written Opionin of the International Searching Authority dated Feb. 14, 2007, International App. No. PCT/EP2006/006688.
PCT International Search Report dated Feb. 22, 2007, International App. No. PCT/EP2006/006689.
PCT Written Opionin of the International Searching Authority dated Feb. 22, 2007, International App. No. PCT/EP2006/006689.
PCT International Search Report dated Feb. 22, 2007, International App. No. PCT/EP2006/006690.
PCT Written Opionin of the International Searching Authority dated Feb. 22, 2007, International App. No. PCT/EP2006/006690.
International-type Search report dated Jan. 18, 2006, Swedish App. No. 0501604-3.
International-type Search report dated Jan. 18, 2006, Swedish App. No. 0501603-5.
International-type Search report dated Jan. 18, 2006, Swedish App. No. 0501602-7.
Asawanonda et al., 2000, "308-nm excimer laser for the treatment of psoriasis: a dose-response study." Arach. Dermatol. 136:619-24.
Coven et al., 1999, "PUVA-induced lymphocyte apoptosis: mechanism of action in psoriasis." Photodermatol. Photoimmunol. Photomed. 15:22-7.
Dabringhausen et al., 2002, "Determination of HID electrode falls in a model lamp I: Pyrometric measurements." J. Phys. D. Appl. Phys. 35:1621-1630.
Feldman et al., 2002, "Efficacy of the 308-nm excimer laser for treatment of psoriasis: results of a multicenter study." J. Am Acad. Dermatol. 46:900-6.
Gerber et al., 2003, "Ultraviolet B 308-nm excimer laser treatment of psoriasis: a new phototherapeutic approach." Br. J. Dermatol. 149:1250-8.
Honigsmann, 2001, "Phototherapy for psoriasis." Clin. Exp. Dermatol. 26:343-50.
Lichtenberg et al., 2002, "Observation of different modes of cathodic arc attachment to HID electrodes in a model lamp." J. Phys. D. Appl. Phys. 35:1648-1656.
PCT International Search Report, dated Oct. 23, 2007, International App. No. PCT/EP2007/000919.
PCT Written Opinion of the International Searching Authority dated Oct. 23, 2007, International App. No. PCT/EP2007/000919.
Schmitz & Riemann, 2002, "Analysis of the cathode region of atmospheric pressure discharges." J. Phys. D. Appl. Phys. 35:1727-1735.
Trehan & Taylor, 2002, "Medium-dose 308-nm excimer laser for the treatment of psoriasis." J. Am. Acad. Dermatol. 47:701-8.
PCT Written Opinion of the International Searching Authority PCT/EP2007/006940.
PCT International Search Report PCT/EP2007/006940.
PCT International Preliminary Report on Patentability and Written Opinion of the International Searching Authority, dated August 4, 2009, International App. No. PCT/EP2007/000919.
Office Action dated Mar. 19, 2009 of U.S. Appl. No. 11/482,580.
J. R. Davis (ed), ASM Thermal Spray Society, Handbook of Thermal Spray Technology, 2004, U.S., pp. 42-168.
Video—Tumor Destruction Using Plasma Surgery, by Douglas A. Levine, M.D.
Video—Laparoscopic Management of Pelvic Endometriosis, by Ceana Nezhat, M.D.
Video—Tissue Coagulation, by Denis F. Branson, M.D.
Plasma Surgical Headlines Article: Atlanta, Feb. 2, 2010—"New Facilities Open in UK and US".
Plasma Surgical Headlines Article: Atlanta, Feb. 2, 2010—"PlasmaJet to be Featured in Live Case at Endometriosis 2010 in Milan, Italy".
Plasma Surgical Headlines Article: Chicago, Sep. 17, 2008—"PlasmaJet Named Innovation of the Year by the Society of Laparoendoscopic Surgeons".
Marino, M.D., "A new option for patients facing liver resection surgery", Thomas Jefferson University Hospital.
Branson, M.D., 2005, "Preliminary experience with neutral plasma, a new coagulation technology, in plastic surgery", Fayetteville, NY.
Merloz, 2007, "Clinical evaluation of the Plasma Surgical PlasmaJet tissue sealing system in orthopedic surgery—Early report", Orthopedic Surgery Department, University Hospital, Grenoble, France.
Charpentier et al., 2008, "Multicentric medical registry on the use of the Plasma Surgical PlasmaJet System in thoracic surgery", Club Thorax.
Iannelli et al., 2005, "Neutral plasma coagulation (NPC)—A preliminary report on a new technique for post-bariatric corrective abdominoplasty", Department of Digestive Surgery, University Hospital, Nice, France.

Gugenheim et al., 2006, "Open, muliticentric, clinical evaluation of the technical efficacy, reliability, safety, and clinical tolerance of the plasma surgical PlasmaJet System for intra-operative coagulation in open and laparoscopic general surgery", Department of Digestive Surgery, University Hospital, Nice, France.

Sonoda et al., "Pathologic analysis of ex-vivo plasma energy tumor destruction in patients with ovarian or peritoneal cancer", Gynecology Service, Department of Surgery—Memorial Sloan-Kettering Cancer Center, New York, NY—Poster.

White Paper—Plasma Technology and its Clinical Application: An introduction to Plasma Surgery and the PlasmaJet—a new surgical tehnology.

White Paper—a Tissue Study using the PlasmaJet for coagulation: A tissue study comparing the PlasmaJet with argon enhanced electrosurgery and fluid coupled electrosurgery.

PlasmaJet English Brochure.

Plasma Surgery: A Patient Safety Solution (Study Guide 002).

News Release and Video—2009, New Sugical Technology Offers Better Outcomes for Women's Reproductive Disorders: Stanford First in Bay Area to Offer PlasmaJet, Stanford Hospital and Clinics. www.plasmasurgical.com, as of Feb. 18, 2010.

510(k) Summary, dated Oct. 30, 2003.

510(k) Summary, dated Jun. 2, 2008.

International Preliminary Report on Patentability of International application No. PCT/EP2007/006939, dated Feb. 9, 2010.

International Preliminary Report on Patentability of International application No. PCT/EP2007/006940, dated Feb. 9, 2010.

U.S. Appl. No. 12/696,411: Suslov, Jan. 29, 2010.

U.S. Appl. No. 12/557,645; Suslov, Sep. 11, 2009.

Office Action of U.S. Appl. No. 11/890,937, dated Sep. 17, 2009.

Office Action of U.S. Appl. No. 11/482,583, dated Oct. 18, 2009.

510(k) Notification (21 CFR 807.90(e)) for the Plasma Surgical Ltd. PlasmaJet® Neutral Plasma Surgery System, Section 10—Executive Summary—K080197.

Aptekman, 2007, "Spectroscopic analysis of the PlasmaJet argon plasma with 5mm-0.5 coag-cut handpieces", Document PSSRP-106—K080197.

Chen et al., 2006, "What do we know about long laminar plasma jets?", Pure Appl Chem; 78(6):1253-1264.

Cheng et al., 2006, "Comparison of laminar and turbulent thermal plasma jet characteristics—a modeling study", Plasma Chem Plasma Process; 26:211-235.

CoagSafe™ Neutral Plasma Coagulator Operator Manual, Part No. OMC-2100-1, Revision 1.1, dated Mar. 2003—Appendix 1of K030819.

Deb et al., "Histological quantification of the tissue damage caused in vivo by neutral PlasmaJet coagulator", Nottingham University Hospitals, Queen's medical Centre, Nottingham NG7 2UH—Poster.

Electrosurgical Generators Force FX™ Electrosurgical Generators by ValleyLab—K080197.

Erbe APC 300 Argon Plasma Coagulation Unit for Endoscopic Applications, Brochure—Appendix 4 of K030819.

Force Argon™ II System, Improved precision and control in electrosurgery, by Valleylab—K080197.

Haines et al., "Argon neutral plasma energy for laparoscopy and open surgery recommended power settings and applications", Royal Surrey County Hospital, Guildford Surrey, UK.

Haemmerich et al., 2003, "Hepatic radiofrequency ablation with internally cooled probes: effect of coolant temperature on lesion size", IEEE Transactions of Biomedical Engineering; 50(4):493-500.

Huang et al., 2008, "Laminar/turbulent plasma jets generated at reduced pressure", IEEE Transaction on Plasma Science; 36(4):1052-1053.

Letter to FDA re: 501(k) Notification (21 CFR 807.90(e)) for the PlasmaJet® Neutral Plasma Surgery System, dated Jun. 2, 2008—K080197.

McClurken et al., "Histologic characteristics of the TissueLink Floating Ball device coagulation on porcine liver", TissueLink Medical, Inc., Dover, NH; Pre-Clinical Study #204.

McClurken et al., "Collagen shrinkage and vessel sealing", TissueLink Medical, Inc., Dover, NH; Technical Brief #300.

Nezhat et al., 2009, "Use of neutral argon plasma in the laparoscopic treatment of endometriosis", Journal of the Society of Laparoendoscopic Surgeons.

Notice of Allowance dated May 15, 2009, of U.S. Appl. No. 11/890,938.

Palanker et al., 2008, "Electrosurgery with cellular precision", IEEE Transactions of Biomedical Engineering; 55(2):838-841.

Pan et al., 2001, "Generation of long, laminar plasma jets at atmospheric pressure and effects of low turbulence", Plasma Chem Plasma Process; 21(1):23-35.

Pan et al., 2002, "Characteristics of argon laminar DC Plasma Jet at atmospheric pressure", Plasma Chem and Plasma Proc; 22(2):271-283.

Plasmajet Neutral Plasma Coagulator Operator Manual, Part No. OMC-2100-1 (Revision 1.7, dated May 2004)—K030819.

Plasmajet Neutral Plasma Coagulator Brochure mpb 2100—K080197.

Plasmajet Operator Manual Part No. OMC-2130-EN (Revision 3.1/Draft) dated May 2008—K080197.

Premarket Notification 510(k) Submission, Plasma Surgical Ltd.—PlasmaJet™ (formerly CoagSafe™) Neutral Plasma Coagulator, Additional information provided in response to the e-mail request dated Jul. 14, 2004—K030819.

Premarket Notification 510(k) Submission, Plasma Surgical Ltd. CoagSafe™, Section 4 Device Description—K030819.

Premarket Notification 510(k) Submission, Plasma Surgical Ltd. PlasmaJet®, Section 11 Device Description—K080197.

Premarket Notification 510(k) Submission, Plasma Surgical Ltd. CoagSafe™, Section 5 Substantial Equivalence—K030819.

Report on the comparative analysis of morphological changes in tissue from different organs after using the PlasmaJet version 3 (including cutting handpieces), Aug. 2007—K080197.

Severtsev et al, "Comparison of different equipment for final haemostasis of the wound surface of the liver following resection", Dept. of Surgery, Postgraduate and Research Centre, Medical Centre of the Directorate of Presidential Affairs of the Russian Federation, Moscow, Russia—K030819.

The Edge in Electrosurgery From Birtcher, Brochure—Appendix 4 of K030819.

The Valleylab Force GSU System, Brochure—Appendix 4 of K030819.

Treat, "A new thermal device for sealing and dividing blood vessels", Dept. of Surgery, Columbia University, New York, NY.

Zenker, 2008, "Argon plasma coagulation", German Medical Science; 3(1):1-5.

Device drawings submitted pursuant to MPEP §724.

Office Action of U.S. Appl. No. 11/890,937 dated Apr. 9, 2010.

Office Action of U.S. Appl. No. 11/482,582 dated Jun. 23, 2010.

Office Action of U.S. Appl. No. 11/482,581 dated Jun. 24, 2010.

U.S. Appl. No. 12/841,361, filed Jul. 22, 2010, Suslov.

International Search Report of International application No. PCT/EP2010/051130, dated Sep. 27, 2010.

Written Opinion of International application No. PCT/EP2010/051130, dated Sep. 27, 2010.

Severtsev et al. 1997, "Polycystic liver disease: sclerotherapy, surgery and sealing of cysts with fibrin sealant", European Congress of the International Hepatobiliary Association, Hamburg, Germany Jun. 8-12; p. 259-263.

Severtsev et al., "Comparison of different equipment for final haemostasis of the wound surface of the liver following resection", Dept. of Surgery, Postgraduate and Research Centre, Medical Centre of the Directorate of Presidential Affairs of the Russian Federation, Moscow, Russia—K030819.

Office Action of U.S. Appl. No. 12/557,645, dated Nov. 26, 2010.

Office Action of U.S. Appl. No. 11/482,582, dated Dec. 6, 2010.

Office Action of U.S. Appl. No. 11/482,581 dated Dec. 8, 2010.

Office Action of U.S. Appl. No. 12/557,645, dated Nov. 26, 2010.

* cited by examiner

PLASMA SPRAYING DEVICE AND METHOD

FIELD OF INVENTION

The present invention is in the field of plasma spray technology. In particular a plasma generating device and a method for spraying flowable materials are disclosed.

BACKGROUND

Plasma spraying devices are used for spraying various flowable materials, such as powdered materials (or simply powders), in a number of applications, including, for example, in connection with coating applications. Such devices typically comprise a cathode, an anode, and a plasma channel extending between the cathode and through the anode. During operation, a plasma-generating gas is supplied to the plasma channel. The electrical arc formed between the cathode and the anode heats the gas flowing through the plasma channel, forming a plasma flow (sometimes also called a plasma stream or plasma jet). The plasma flow exits the device through an outlet in the anode at the end of the plasma channel. Several different types of plasma spraying devices are known. These types may be characterized by the position at which a flowable material is introduced (or injected) into the plasma flow. The following discussion relates to powder spraying devices. However, a person of skill in the art will appreciate that other materials may be used for spraying.

In one type of device, the powder is introduced into the plasma flow at the anode area. In some devices of this type, the powder is introduced into the plasma flow through inlets in the anode, as disclosed in, for example, U.S. Pat. Nos. 3,145,287, 4,256,779, and 4,445,021. In other devices of this type the powder is introduced into the plasma flow by feeders located outside the plasma-generating device, as disclosed, for example, in U.S. Pat. No. 4,696,855. Typically, the powder is injected substantially perpendicular to the plasma flow.

One advantage associated with devices of this type is that when the powder is injected into the plasma flow, the plasma flow is fully developed and has certain known properties, such as temperature, velocity, energy, etc. These properties depend on, and can be controlled by, the internal geometry of the plasma channel, the nature of the gas used to generate the plasma, the pressure with which the gas is supplied, the difference in electric potential between the cathode and the anode, etc. Another advantage of supplying the powder at the anode area is that the formation of plasma flow is unaffected by the powder.

However, introducing the powder at the anode area has disadvantages. Typical powders have particles of different sizes. When such powder is injected into the plasma flow, heavier particles, which have higher kinetic energy, reach the center of the plasma stream faster than lighter particles. Therefore, the lighter particles may reach the center of the plasma flow in the relatively cold zones of the plasma flow located further away from the anode, or the lighter particles may remain on the periphery of the plasma flow never reaching its center. This creates two undesired effects. First, there is a low level of homogeneity of the powder in the flow because the heavier particles are subjected to a higher temperature for a longer period of time compared to the lighter particles. The lighter particles may not be sufficiently heated for the coating applications. Second, the distribution of the coating is not uniform, and some particles may simply miss the surface to be coated, which leads to poor material economy. In other words, the powder-sprayed coating is produced using only a portion of the supplied powder. This is particularly disadvantageous when expensive powders are used. The problem can be mitigated to some extent by using powders with particles of equal mass. However, such powders are more expensive to manufacture and using them may not be a viable alternative for all applications.

To avoid problems associated with the substantially perpendicular injection of powder in the anode area of the plasma channel, attempts have been made to provide a longitudinal powder supply channel. The powder supply channel is arranged inside the plasma channel and is surrounded by the plasma flow during operation of the device. The outlet of the powder supply channel is in the anode area of the plasma channel. This interior powder supply channel, arranged inside the plasma channel, prevents adequate heating of the plasma flow and, in general, has undesirable effects on the plasma flow properties.

A further disadvantage associated with introducing the powder at the anode is that a large amount of energy is needed to maintain the high temperature and specific power (power per unit of volume) of the plasma flow so as to obtain a highly homogeneous coating. It is believed that the cause of this problem is that the temperature and velocity distribution of the plasma flow is virtually parabolic at the outlet of the plasma channel where the powder is injected. Thus, the temperature and velocity gradient and the thermal enthalpy of the plasma flow are inversely proportional to the diameter of the plasma flow. To increase the homogeneity of the sprayed coating, it is therefore necessary to increase the diameter of the plasma flow, which in turn requires a lot of energy.

In a second type of device, the powder is supplied at the inlet of the plasma channel, at the cathode. In these devices, the electric arc heats both the plasma generating gas and the powder. The cathode area is considered to be a cold zone, which allows the powder to be introduced in the center of the plasma flow. Examples of devices of the second type are disclosed in, for example, U.S. Pat. No. 5,225,652, U.S. Pat. No. 5,332,885, and U.S. Pat. No. 5,406,046.

When plasma is generated by supplying a plasma generating gas to the plasma channel and heating the gas with an electric arc of a predetermined discharge current, only a small portion of the gas forms the center of the plasma flow where the temperature is high. The remaining gas flows closer to the walls of the plasma channel, where the temperature is lower, forming the cold layer of the plasma flow. The cold powder particles interfere with the temperature increase of the plasma in the flow, and the powder in the periphery of the flow never reaches the desired temperature. Because of this temperature distribution in the plasma flow, only a small portion of the powder, supplied at the inlet of the plasma channel, flows in the high temperature center of the plasma flow and is sufficiently heated by the electric arc. The remaining powder flows in the cold layer of the plasma flow. This causes an uneven heating of the powder, which affects the quality of the surface coating. Furthermore, there is a risk of the plasma channel being clogged by the powder, which has a detrimental effect on the conditions required for a stable plasma flow.

Increasing the transfer of mass to the central part of the channel by increasing the rate of the gas and powder flows is not a practicable alternative. When the flow of the gas and powder increases, while the current remains constant, the diameter of the electric arc decreases, which just aggravates the problem of the powder accumulating in the cold layer along the plasma channel walls. Furthermore, for those particles that end up in the center of the plasma flow, the time spent in the plasma flow decreases, because the velocity of those particles increases. Therefore, the amount of the powder in the high temperature plasma flow center cannot be increased if the current remains constant. Increasing the operating current, however, causes disadvantages associated with both the design and handling of the plasma-spraying devices.

In devices of a third type, a portion of the plasma channel is formed by intermediate electrodes electrically insulated from the anode and the cathode. The powder is introduced into the plasma flow in the portion of the plasma channel formed by the intermediate electrodes, typically between two electrodes. Thus, the powder is supplied neither at the inlet of the plasma channel nor at the outlet of the plasma channel. Examples of devices of the third type are disclosed in, for example, U.S. Pub. No. 2006/0091116A1.

The device disclosed in U.S. Pub. No. 2006/0091116A1 has two plasma channel sections. The section of the plasma channel located upstream from the powder feeder is formed by one or more intermediate electrodes and is used to create optimal conditions in the plasma flow. In particular, during operation, the plasma is heated to a temperature sufficient to melt the powder throughout the entire cross section of the plasma channel. This eliminates the problem associated with powder particles traveling in the cold layer of the flow, and reduces the risk of clogging when particles stick to the walls of the plasma channel. The section located downstream from the powder feeder is also formed by one or more intermediate electrodes and is used to achieve a high level of homogeneity and temperature of the powder particles in the flow thus obviating the problems associated with supplying the powders at the anode. By controlling the properties of the downstream section, such as its length and the number of intermediate electrodes forming the section, optimal conditions of the powder are achieved. These conditions include velocity and temperature level necessary to obtain the required adhesion, structure, and porosity in the sprayed coating for a specific combination of the power material and the coating application. However, because the velocity of the plasma flow and the powder particles that it carries is relatively low, the powder particles have low kinetic energy when they exit the device.

To achieve higher velocities of powder particles, some spraying devices use throttling portions. For example so-called cold spray or velocity spray devices pressurize a relatively cold gas carrying a powder and then use a throttling portion to accelerate the gas carrying the powder to high velocities. Such devices use the kinetic energy of the powder particles for coating. Throttling portions have been long known in the art. Briefly, they are used to convert pressure of a gas flow into velocity. Throttling portions were first used in jet engines, but now they are also used in plasma generating devices. A known variation of a throttling portion is the supersonic nozzle (also called the de Laval nozzle), which is capable of accelerating the plasma flow to supersonic speeds. U.S. application Ser. No. 11/482,582 discloses the use of the supersonic nozzle in a multi-electrode plasma generating device used for cutting, evaporating, and coagulating biological tissues. U.S. application Ser. No. 11/482,582, however, is not concerned with features of the throttling portion useful for spraying applications, such as the drop in the static pressure of the plasma flow that facilitates the injection of powders and the ability to use nanoparticles for spraying.

Plasma spraying devices that use throttling portions may fall into any of the three categories set forth above. However, because of their use of the throttling portions, they are discussed separately. U.S. Pub. No. 2006/0108332 discloses the use of a throttling portion in a plasma spraying device. In particular, this publication discloses a throttling portion which is located essentially in the end of the plasma channel closest to the cathode. During operation of this device, after the plasma generating gas is briefly heated by a cathode in the heating chamber near the cathode, the gas passes through the throttling portion. The throttling portion increases the speed of the gas, in some embodiments beyond the speed of sound, and decreases the static pressure of the gas. The powder is injected into the plasma flow after the plasma passes the throttling portion at a point in the plasma channel where the plasma reaches its maximum speed and has minimum static pressure. However, because the throttling portion is arranged essentially at the cathode end of the plasma channel, the plasma flow is heated by the electric arc only while it passes through the throttling portion. Accordingly, the plasma reaches the speed of sound while it is essentially cold. Because the speed of sound is higher at higher temperatures, the absolute speed that the plasma generating gas achieves is relatively low. Due to the relatively low speed the plasma does not achieve a high power density. Furthermore, because the powder is injected in the area of the anode in the device disclosed in U.S. Pub. No. 2006/0108332, the device exhibits limitations generally associated with the devices of the first type discussed above.

U.S. Pub. No. 2006/0037533 discloses the use of a throttling portion in a thermal spraying device. The device comprises (1) a heating module used for heating a flow of gas (or plasma, in some embodiments), (2) a forming module used to decrease the static pressure and increase the speed of the gas stream; (3) a powder feeding module that is used to inject powder into the flow; and (4) a barrel module used to carry the powder in the stream, so that the powder achieves necessary properties. The publication discloses a number of different ways of implementing a heating module. For example, in some embodiments the heating module is a combustion type heating module, which heats the gas by combusting acetylene. After the gas is heated to 3,100° C., it is passed to the forming module. After the velocity and pressure of the gas flow are transformed by the forming module, the powder is injected into the gas flow in the powder feeding module. The powder particles, carried by the gas flow, achieve properties required for a particular spraying application in the barrel module.

U.S. Pub. No. 2006/0037533 discloses another embodiment of the heating portion implemented as a multielectrode plasma torch This plasma torch has a cathode, an anode, and a plurality of intermediate electrodes. The anode and the intermediate electrodes form a plasma channel. The publication further discloses a throttling portion, distinct from the one in the forming module, located essentially in the end of the plasma channel closest to the cathode. During operation of this heating module, after the plasma generating gas is heated by the cathode in a heating chamber near the cathode, the gas passes through the throttling portion. The throttling portion accelerates the flow, in some embodiments beyond the speed of sound, and decreases the static pressure of the gas.

Some devices, such as the one disclosed in U.S. Pub. No. 2006/0091116A1 discussed above, provide for injection of different flowable materials. This feature is desirable for some plasma spraying applications.

Accordingly, presently there is a need for a plasma spraying device that overcomes the limitations of the currently known devices by maximizing the energy density of the device while enabling control of both kinetic and thermal energy of the plasma flow carrying the powder particles at the outlet of the device. In particular, there is a need for a plasma spraying device and method that generates a plasma flow having a temperature and speed that enables one or more flowable materials to be injected into the plasma flow by applying a relatively low pressure, while also enabling control of the characteristics of the plasma and the flowable materials when they exit the plasma channel.

SUMMARY OF THE INVENTION

The present invention provides a plasma generating device comprising an anode, a cathode and a plasma channel, extending longitudinally between the cathode and anode. The plasma channel has an outlet opening at the anode end of the device and a throttling portion. A part of the plasma channel is formed by two or more intermediate electrodes electrically insulated from each other and the anode. The throttling portion of the device divides the plasma channel into a high pressure portion positioned on the side of the throttling portion closest to the cathode and a low pressure portion positioned on the side of the throttling portion closest to the anode. The throat of the throttling portion has a cross sectional area transversely to the longitudinal direction of the plasma channel smaller than both the minimum cross sectional area of the high pressure portion and the minimum cross sectional area of the low pressure portion. In the low pressure portion of the plasma channel, the device also has one or more flowable material injectors which include a flowable material chamber having an inlet and a flowable material feeder connecting the flowable material chamber to the plasma channel. Together the flowable material feeder and the flowable material chamber are referred to as the flowable material injector.

In the plasma spraying device, the high pressure portion of the plasma channel is formed by at least one, but preferably two or more, intermediate electrodes. This enables the plasma flow that reaches the throttling portion to be sufficiently heated to achieve a high level of homogeneity of a given flowable material, such as powder, injected into the plasma flow. The low pressure portion of the plasma channel is formed by at least one, but preferably two or more, intermediate electrodes. This enables sufficient heating of the flowable material for a given spraying application after the flowable material is injected into the plasma flow.

During operation, a plasma generating gas is supplied to the plasma channel. As the gas flows through the plasma channel, it is heated by an electric arc formed between the cathode and the anode. The temperature increase of the electric arc results in gas ionization and plasma formation. The static pressure of the plasma in the high pressure portion of the plasma channel is relatively high. As the plasma passes through the throttling portion, its velocity pressure increases and the static pressure decreases. The increase in the velocity pressure may accelerate the plasma flow to supersonic speeds. At the end of the throttling portion closest to the anode, the static pressure of the plasma is at its minimum. The flowable material is injected into the plasma flow in the low pressure portion, which, due to the low static pressure of the plasma, requires minimal pressure.

The injection of the flowable material in the described device results in a high level of homogeneity of the flowable material because the plasma is sufficiently heated while passing through the high pressure portion. Because the flowable material carrier gas mixes with hot plasma, the temperature of the plasma drops and is lower than the temperature of the plasma before the flowable material is injected. For some spraying applications a high temperature of the flowable material particles may be required. As the aggregate flow of plasma carrying the particles of the flowable material passes through the remaining portion of the low pressure portion, the electric arc heats the plasma, which heats the particles.

In some embodiments, the device enables injection of two or more flowable materials. In an exemplary embodiment that enables injection of two flowable materials, the device comprises a second flowable material injector. The second flowable material injector is arranged in a way that enables the particles of the injected first flowable material to be sufficiently heated before the second flowable material is injected. At the same time, the second flowable material injector is arranged in such a way that enables particles of both flowable materials to be sufficiently heated for a given spraying application before the aggregate flow exits the device. In some embodiments, the device may comprise additional flowable material injectors provided that the following conditions are met: (1) plasma and particles of all flowable materials injected upstream from a given flowable material have to be sufficiently heated before the given flowable material is injected in the flow and (2) particles of all flowable materials injected up to a point must be sufficiently heated (i) before exiting the device for a given spraying application, or (ii) before injecting another flowable material. Note that it may not be necessary to heat particles of a flowable material to the temperature required when the flow exits the device before injecting another flowable material because particles of both flowable materials are heated following injection of the second flowable material. Accordingly, the invention also provides a method of plasma-spraying one or more flowable materials comprising creating a plasma flow which is heated to at least 10,000° K. and thereafter increasing the velocity pressure of the heated plasma in the flow while concurrently decreasing the static pressure of the heated plasma in the flow, whereupon one or more flowable materials are injected into the flow of plasma. In the method of the invention, after each flowable material is injected, the particles of all flowable materials in the flow are heated to an appropriate temperature by heating the plasma in the flow before being output in the plasma.

DESCRIPTION OF PREFERRED EMBODIMENTS

Figure 1:
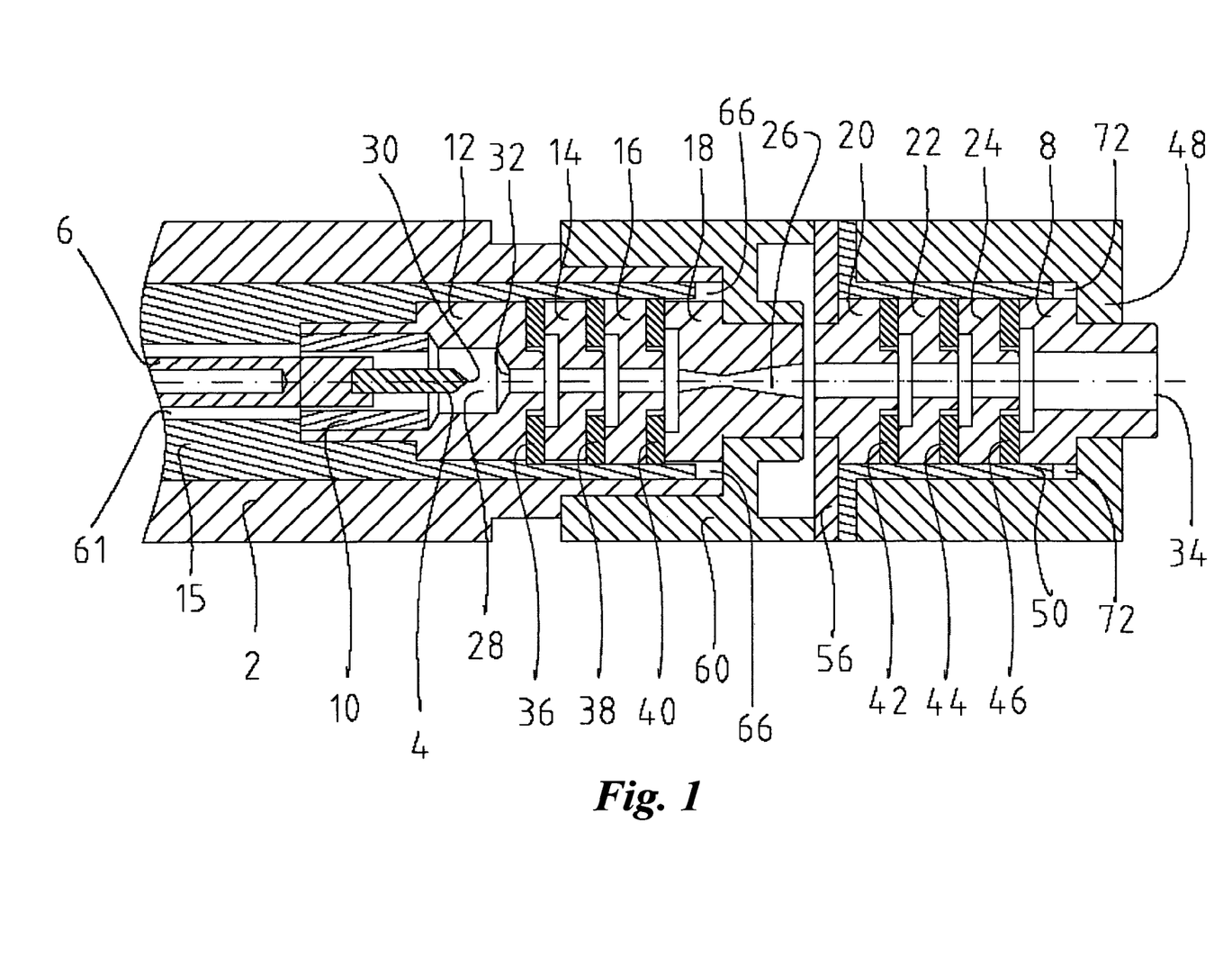
FIG. 1 illustrates a cross sectional longitudinal view of an embodiment of the device of the invention with a single flowable material injector.
Figure 2:
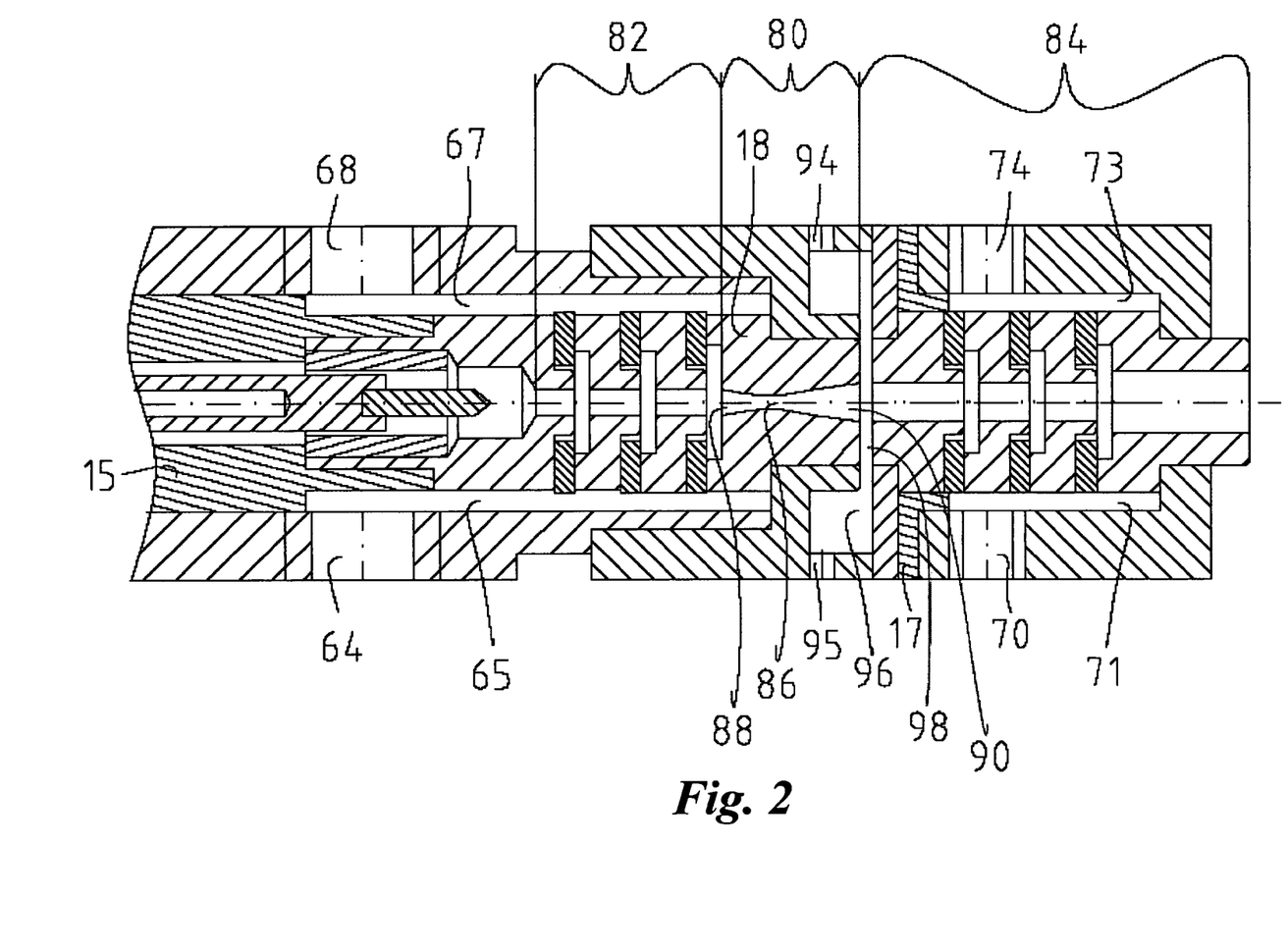
FIG. 2 illustrates a cross sectional longitudinal view, transversely to the view illustrated in FIG. 1 of an embodiment of the device of the invention with a single flowable material injector.

FIGS. 1 and 2 illustrate one embodiment of a plasma-spraying device according to the invention. The embodiment depicted in FIGS. 1 and 2 is a powder spraying device with a single flowable material injector. However, it should be understood that this is an exemplary embodiment and is not meant to limit the scope of the invention to the use of a powder or to the use of a single flowable material or a single injector. For purposes of this disclosure, the expression "flowable material" is defined as any material that flows in a vessel under pressure. Flowable materials include, but are not limited to, liquids, gases, or particles of solid materials carried by a fluid. The term "powder" in the present disclosure should be understood as small particles of a material that can be carried by a fluid, such as a gas; for the purposes of this disclosure, a "powder" is a flowable material. Another variation of a flowable material is a solution of powder particles, such as nanoparticles, in a liquid precursor used, for example, in a spraying technique known as Suspension Precursor Plasma Spray (SPPS). During operation, such a solution is atomized and injected into the plasma flow as a flowable material.

FIG. 1 shows a longitudinal cross-section of the device. Although the following discussion refers to the use of a powder, it shall be understood that any other type of flowable material may be used. In the embodiment of FIG. 1, a casing 2, a flowable material assembly 60, a washer 56, and a casing 48 form the outside of the device. In this embodiment the device is cylindrical and all elements are annular and are arranged coaxially. In other embodiments, however, the device may not be cylindrical and a different internal or external geometry may be used. The device comprises a cathode 4, preferably made of tungsten containing lanthanum, which is arranged in a cathode holder 6, and an anode 8. Insulator element 10 surrounds a portion of cathode 4 furthest from anode 8 and a portion of the cathode holder 6. Insulator element 10 provides both thermal and electrical insulation of cathode 4.

Annular intermediate electrodes 12, 14, 16, 18, 20, 22, and 24 and anode 8 form a plasma channel 26. Plasma channel 26 has an inlet 32 at the end closest to cathode 4 and an outlet (or opening) 34 at the end furthest from cathode 4. Annular insulators 36, 38, 40, 42, and 44 are located between intermediate electrodes 12, 14, 16, 18, 20, 22, and 24 and provide electrical insulation between adjacent intermediate electrodes. Annular insulator 46 is located between intermediate electrode 24 and anode 8 and provides electrical insulation between them.

Intermediate electrode 12, which is furthest from anode 8, forms a plasma chamber 28 around cathode tip 30. The plasma chamber 28 is connected to the inlet of the plasma channel 32. Space 61 provides a passage for plasma generating gas to plasma chamber 28.

FIG. 2 shows a longitudinal cross section that is transverse to the longitudinal cross section shown in FIG. 1. FIG. 2 illustrates portions of the plasma channel. Intermediate electrode 18 forms a throttling portion 80. Throttling portion 80 divides the plasma channel 26 into two portions: a high pressure portion 82 and a low pressure portion 84. The high pressure portion 82 is formed by one or more intermediate electrodes. Preferably, the high pressure portion 82 is formed by two or more intermediate electrodes. In the embodiment shown in FIGS. 1 and 2, the high pressure portion 82 of plasma channel 26 is formed by three intermediate electrodes 12, 14, and 16. The high pressure portion should have a length sufficient to ensure that when a powder is injected into the plasma, the plasma has a temperature sufficient to melt the powder across the entire cross section of plasma channel 26.

The low pressure portion 84 is formed by at least one, but preferably two or more, intermediate electrodes. In the embodiment shown in FIGS. 1 and 2, the low pressure portion 84 is formed by three intermediate electrodes 20, 22, and 24. The low pressure portion 84 should have a length sufficient to ensure that particles of the powder carried by the plasma are heated to the temperature required for a given spraying application.

The throttling portion 80 has an hourglass shape. The narrowest part of the throttling portion 80 is throat 86, which divides the throttling portion into a converging portion 88 and a diverging portion 90. In the preferred embodiment the throttling portion 80 is a supersonic nozzle, also known as a de Laval nozzle. (For the purposes of clarity, in this disclosure, unless otherwise specified, the phrase "cross sectional area" means "cross sectional area transversely to the longitudinal direction of the plasma channel 26.") The cross sectional area of throat 86 is smaller than both (a) the cross sectional area of the high pressure portion 82 and (b) the cross sectional area of the low pressure portion 84. In the preferred embodiment, the cross sectional area of the high pressure portion 82 is smaller than or equal to the cross sectional area of the low pressure portion 84. In other embodiments the cross sectional area of the high pressure portion 82 is greater than the cross sectional area of the low pressure portion 84.

During operation, after the initial startup of the device, an electric arc between the cathode 4 and the anode 8 is maintained. The plasma generating gas flows in the plasma channel 26 from the inlet 32 to the outlet 34. The electric arc heats the plasma generating gas causing ionization of the plasma generating gas, which results in generation of plasma. The direction in which the plasma traverses the plasma channel 26, from the inlet 32 to the outlet 34 is referred to as the direction of the plasma flow.

The plasma generating gas is supplied through the space 61 to the inlet 32 of plasma channel 26 under pressure. The total pressure of the plasma consists of the velocity pressure and the static pressure. In the context of this description, the velocity pressure refers to the pressure that pushes the plasma flow along the plasma channel and the static pressures refers to the pressure that the plasma exerts on the walls of the plasma channel. The velocity pressure of the plasma is proportional to the velocity of the plasma flow squared. Conversely, the velocity of the plasma flow is proportional to the square root of the velocity pressure of the plasma. As the plasma enters the converging portion 88, the velocity pressure of the plasma increases because the mass flow rate (mass per time) is constant. At the throat 86, where the cross sectional area of the plasma channel is minimal, the plasma velocity becomes transonic, Mach 1, a condition called a choked flow. As the cross sectional area increases in the diverging portion 90, the plasma continues to expand so that the static pressure of the plasma decreases and the velocity pressure of the plasma increases. In the diverging portion 90, the velocity of the plasma flow increases to supersonic velocities, Mach >1.0. At the same time, in the diverging portion 90, the static pressure of the plasma decreases. The total pressure of the plasma remains substantially constant.

The velocity pressure of the plasma and the velocity of plasma flow reach their maximum at the end of the throttling portion 80 closest to anode 8. Conversely, the static pressure of the plasma reaches its minimum at the end of the throttling portion 80 closest to anode 8. The physical process that the plasma undergoes when passing through the throttling portion 80 is isentropic, meaning that the entropy of the plasma does not change. Essentially, the throttling portion 80 increases the velocity pressure of the plasma and decreases the static pressure of the plasma relative to the pressures observed in high pressure portion 82.

Accordingly, the high pressure portion 82 is characterized by (1) high static pressure of the plasma, which is preferably in the range of 5-100 Bar; (2) low velocity pressure of the plasma, and (3) low velocity of the plasma flow. The average temperature of the plasma flow in the high pressure portion is preferably 10-20° kK. If argon is used as a plasma generating gas, the electric field of the plasma is preferably 5-50 V/mm. The power density of the plasma in the high pressure portion is preferably in the range of 0.5-10 kW/mm$^3$.

When the plasma enters the converging portion 88 of the throttling portion 80, its temperature is preferably 10-20° kK. When plasma exits the diverging portion 90 of the throttling portion 80, its temperature drops preferably to 8-13° kK. The velocity of the plasma at the end of the diverging portion 90 closest to the anode 8 is preferably 1-10 km/s, with the Mach number in the range of 1.2-3. The pressure of the plasma in the diverging portion 90 is preferably in the range of 1-5 Bar.

The low pressure portion 84 is characterized by (1) low static pressure of the plasma, which is preferably close to atmospheric pressure, (2) high velocity pressure of the plasma, and (3) high velocity of the plasma flow that results in a high average powder velocity that is preferably 400-1,000 m/s. The average temperature of the plasma flow is preferably in the range of 10-15° kK. The average powder temperature is the melting temperature of the powder. The electric field of the plasma in the low pressure portion 84 is preferably 1-10 V/mm. The power density of the plasma in the low pressure portion 84 is preferably in the range of 0.2-0.8 kW/mm$^3$.

In the embodiment shown in FIG. 2 the powder enters the device through two powder inlets 94 and 95. In other embodiments a different number of powder inlets can be used. The powder inlets 94 and 95 are connected to a powder chamber 96. The powder chamber 96 is arranged around the intermediate electrode 18 and facilitates a uniform distribution of the powder particles along the circumference of the device. The powder feeder 98 connects the powder chamber 96 to the plasma channel 26. In the preferred embodiment the powder feeder 98 connects to the plasma channel 26 at the end of the low pressure portion 84 closest to the throttling portion 80. In other embodiments, the powder feeder 98 can connect the plasma channel 26 to the powder chamber 96 at other points along the plasma channel 26 in the low pressure portion 84, provided that powder particles spend enough time in the plasma channel 26 to achieve required characteristics, such as temperature, velocity, and homogeneity.

Figure 3:
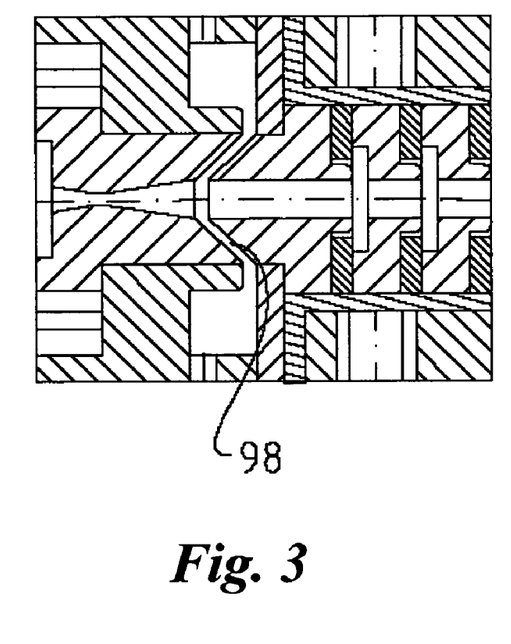
FIG. 3 illustrates a feeder that is angled in the direction opposite to the plasma flow.
Figure 4:
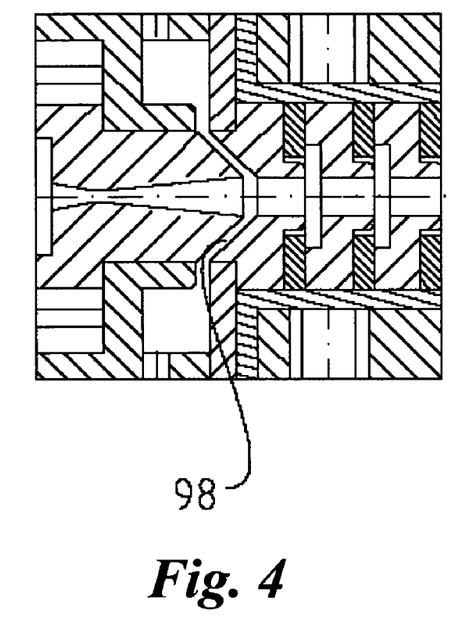
FIG. 4 illustrates a feeder that is angled in the direction of the plasma flow.

In the preferred embodiment, feeder 98 is a slit. In other embodiments, the powder feeder 98 may be implemented as a plurality of channels connecting the powder chamber 96 and the plasma channel 26. In yet other embodiments, powder feeder 98 may be any aperture or a plurality of apertures that provide communication between the powder chamber 96 and the plasma channel 26. FIGS. 1 and 2 illustrate the embodiment in which the slit 98 is perpendicular to the axis of the device. However, this angle does not produce the best distribution of the powder particles in the plasma for all types of powder. As mentioned above, for a high quality coating, it is preferable that powder particles be uniformly distributed in the plasma flow. Using the embodiment illustrated in FIGS. 1 and 2 to spray powder having relatively heavy particles may result in the particles from different directions colliding in the center of plasma channel 26. Using the embodiment illustrated in FIGS. 1 and 2 to spray powder having relatively light particles may result in the particles being pushed to the walls of the plasma channel by the plasma flow before they can even reach the center of the flow. To achieve a more uniform distribution of the powder particles, the feeder 98 may be angled. FIG. 3 illustrates the embodiment in which the feeder 98 is angled in the direction opposite to the plasma flow. This embodiment is desirably used for powders with lighter particles. FIG. 4 illustrates the embodiment in which the slit 98 is angled in the direction of the plasma flow. This embodiment is desirably used for powders with heavier particles.

As mentioned above, the plasma in plasma channel 26 is heated by the electric arc established between cathode 4 and anode 8. In the preferred embodiment, the temperature of the plasma entering the throttling portion 80 is 10,000° K. or above. This temperature increase occurs while the plasma passes through the high pressure portion 82. The temperature of the plasma entering the throttling portion will depend on the characteristics of the high pressure portion 82, in particular its length, which depends on the geometry and the number of the intermediate electrodes used to form the high pressure portion 82.

When the powder is injected into plasma channel 26, it is delivered by a cold carrier gas. As the cold carrier gas mixes with the heated plasma, the temperature of the plasma in the flow significantly drops and becomes lower than its temperature before the powder is injected. For some coating applications, the plasma in the flow has to be heated in the low pressure portion 84, after the powder is injected, so that the powder particles achieve the required temperature and a high level of homogeneity when exiting the device at outlet 34. The electric arc established between the cathode 4 and the anode 8 heats the plasma that carries particles of the injected powder flowing along the low pressure portion 84. In the preferred embodiment, the temperature of the plasma exiting the device at the outlet 34 is 10,000° K. or above. The temperature of the powder particles depends on the time that they spend in the plasma flow, which is controlled by the length of the low pressure portion 84. Some types of powder particles, such as nanoparticles, may evaporate if exposed to the temperature of the heated plasma and then kept at that temperature for a certain period of time. A supersonic speed of the plasma in the low pressure portion 84 enables such particles to melt to the desired consistency without evaporating. Note however that the particles of powder travel with lower speed than the plasma in the flow due to non-ideal transfer of the kinetic energy from the plasma to the powder particles. For a given type of powder, the temperature to which its particles are heated in the low pressure portion 84 and the time it takes for the particles to traverse the low pressure portion 84 may be controlled by the geometry and number of the intermediate electrodes that form the low pressure portion 84.

Coating with nanoparticles presents additional problems. In particular, because of the low mass of nanoparticles, they cannot gain enough momentum to achieve the desired penetration of the plasma flow, even with relatively low static pressure of the plasma flow in the low pressure portion 84. For such nanoparticles, this and other embodiments of the device may be used with SPPS. With SPPS the flowable material that is injected into the plasma flow is an atomized solution of nanoparticles with a liquid precursor. When the atomized solution is injected into the plasma flow, the precursor quickly evaporates, leaving the nanoparticles in the plasma flow to be heated and accelerated.

Figure 6:
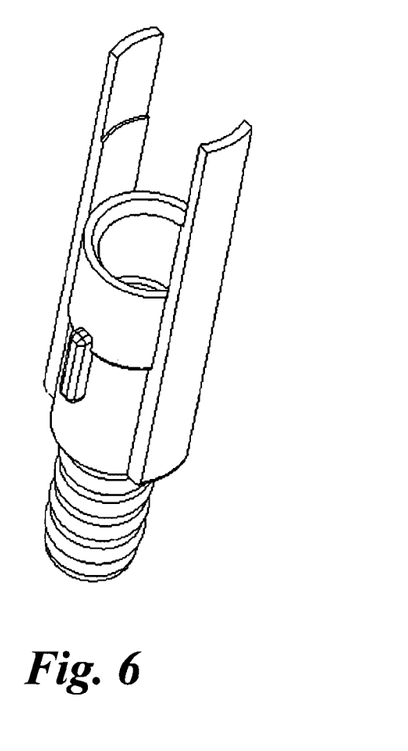
FIG. 6 illustrates a water divider of the cooling system used to cool a throttling portion.
Figure 7:
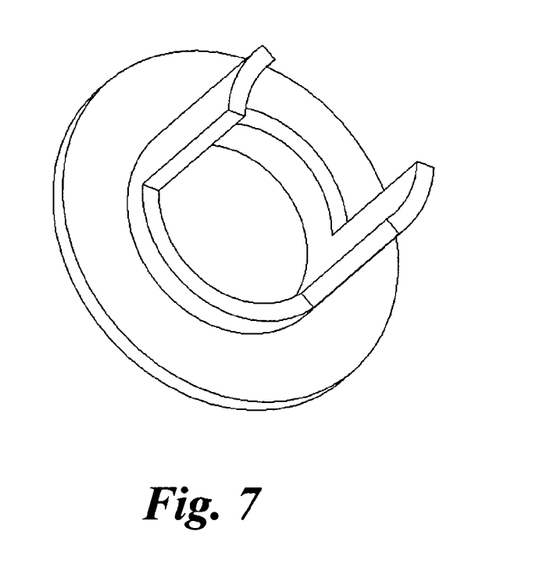
FIG. 7 illustrates a water divider of the cooling system used to cool the anode and other intermediate electrodes.

Turning to FIG. 2 again, during operation, all elements, but especially the anode 8 and the intermediate electrode 18, which electrode 18 forms the throttling portion 80, become heated. For the cooling of the intermediate electrode 18, a coolant, preferably water, is supplied through the inlet 64. The coolant flows through a longitudinal coolant channel 65 in the direction of the plasma flow. The longitudinal coolant channel 65 connects to the circular coolant channel 66 (shown in FIG. 1) that surrounds the intermediate electrode 18, preferably at the cross section of the throat 86. The coolant then flows in the direction opposite to the plasma flow through another longitudinal coolant channel 67 connected to the circular channel 66. The coolant exits the device through the outlet 68. Coolant divider 15, shown separately in FIG. 6, together with other elements, forms the coolant channels 65, 66, and 67. The cooling system of the anode 8 is similar. A coolant, preferably water, enters the device through the inlet 70. The coolant then flows in the direction of the plasma flow through a longitudinal coolant channel 71. Then, the coolant flows in a circular channel 72 around the anode (shown in FIG. 1). After that, the coolant flows in the direction opposite that of the plasma flow through another longitudinal channel 73, and then exits the device through the outlet 74. Coolant divider 17, shown separately in FIG. 7, together with other elements, forms the coolant channels 71, 72, and 73. In some embodiments the same coolant is used for cooling the anode 8 and the intermediate electrode 18. In other embodiments different coolants are used for cooling the anode 8 and the intermediate electrode 18.

Figure 5:
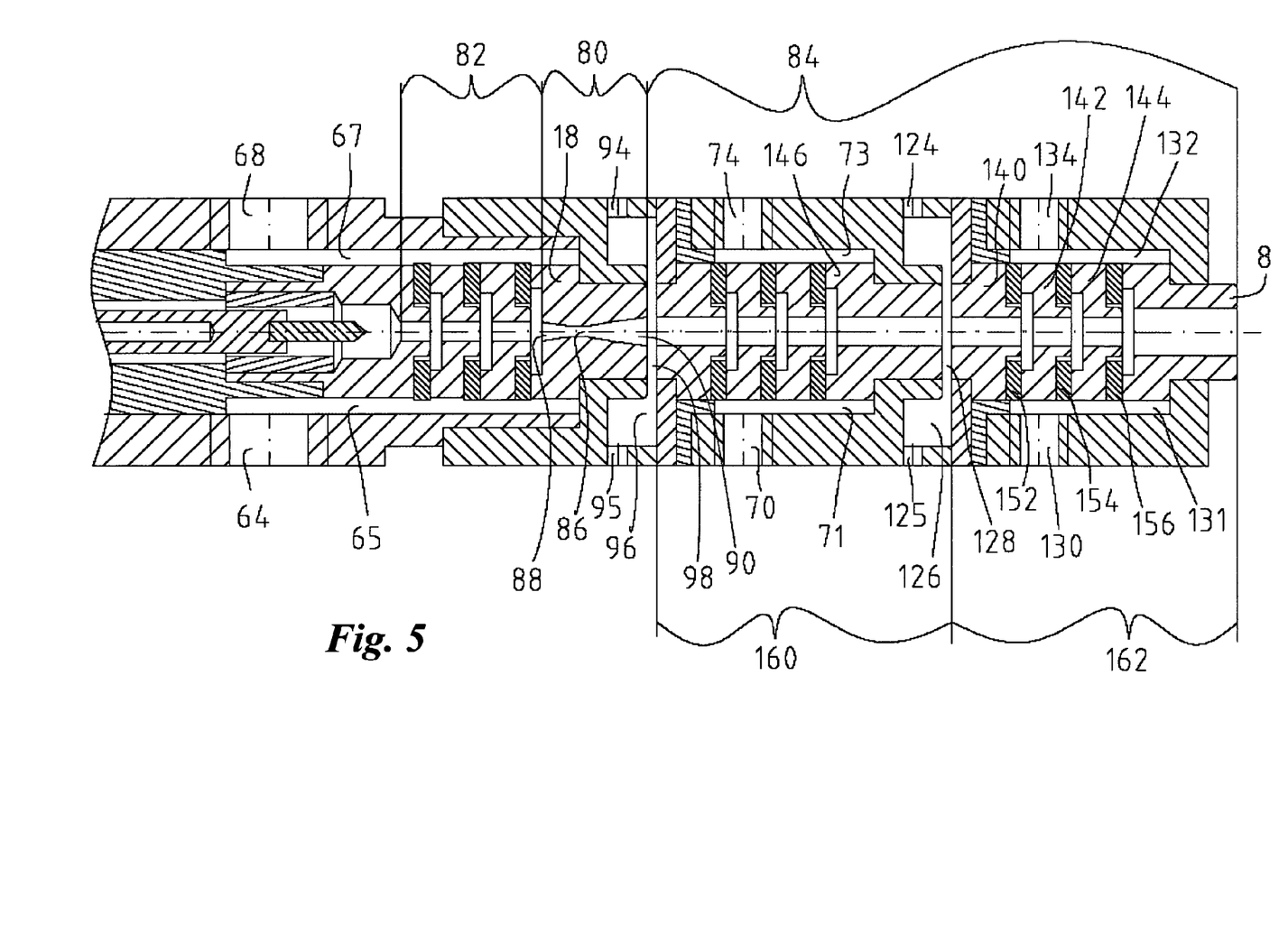
FIG. 5 illustrates a cross sectional longitudinal view of an embodiment of the device with multiple flowable material injectors.

FIG. 5 shows an embodiment of the device with two flowable material injectors. In this embodiment, the high pressure portion 82 is formed by the same intermediate electrodes 12, 14, 16 and the same insulators 36, 38, and 40 as in the first embodiment described above. The low pressure portion 84 is formed by intermediate electrodes 20, 22, 24, 140, 142, and 144, the anode 8, and insulators 42, 44, 46, 152, 154, 156. The portion of the plasma channel 160 between the feeder 98 and the feeder 128 is formed by at least one, but preferably two or more intermediate electrodes. In the embodiment shown in FIG. 5, the portion 160 is formed by three intermediate electrodes 20, 22, 24. The portion of the plasma channel 162 between the feeder 128 and the opening 34 in the anode 8 is also formed by at least one, but preferably two or more intermediate electrodes. In the embodiment shown in FIG. 5, the portion 162 is formed by three intermediate electrodes 140, 142, 144 and the anode 8. In general, in embodiments that have two or more flowable material injectors, the adjacent feeders are separated by at least one, but preferably two or more intermediate electrodes.

Turning back to FIG. 5, portions 160 and 162 are provided with a cooling system. As depicted, each portion has its own cooling system. The cooling system comprising inlet 70, channels 71, 73, and 72 (which is not shown in FIG. 5), and outlet 74 is used to cool intermediate electrode 146, in accordance with the above description. A similar cooling system comprising inlet 130, channels 131, 132, and a channel surrounding the anode (which is not shown in FIG. 5) and the outlet 134 is used to cool the anode 8 in accordance with the above description. In the embodiments that have two or more flowable material injectors, there may be a cooling system for each group of electrodes forming a portion of the plasma channel between each adjacent pair of feeders. These cooling systems may use different cooling agents, and may operate independently from each other.

In embodiments with multiple flowable material injectors, the corresponding feeders may or may not be angled in the same manner. For example, in the embodiment of FIG. 5, both the feeder 98 and the feeder 128 are perpendicular to the direction of the plasma flow. In other embodiments one feeder may be angled in the direction of the plasma flow as shown in FIG. 4, and another feeder may be angled in the direction opposite to the plasma flow as shown in FIG. 3. In some other embodiments, both feeders may be angled in the same direction but at a different angle.

The operation of the embodiment shown in FIG. 5 is similar to the operation of the embodiment shown in FIGS. 1 and 2 described above. In fact, the processes that occur upstream from the feeder 128 are substantially the same. During operation, after a first flowable material has been injected into the plasma flow through the feeder 98, the particles of the first flowable material carried by the plasma traverse the low pressure portion of the plasma channel. At the point where the particles of the first flowable material have been heated to an appropriate temperature, a second flowable material is injected into the plasma flow through the feeder 128. The feeder 128 is connected to a second flowable material chamber 126. The second flowable material is supplied to the second flowable material chamber 126 through inlets 124 and 125. The particles of the two flowable materials carried by the plasma traverse the remainder of the plasma channel and exit through the opening 34 of the anode 8.

The length of portion 160, between the feeders 98 and 128, depends on the properties of the first flowable material. It is controlled by the number and geometry of the intermediate electrodes used to form portion 160. When the second flowable material is injected into the flow, its particles, together with the particles of the first flowable material, are heated by the plasma in the flow. The length of portion 162, between the feeder 128 and the opening 34 of the anode 8, depends on the properties of the second flowable material. It is controlled by the number and geometry of the intermediate electrodes used to form portion 162. The length of portion 162 is selected so that particles of the second flowable material (heated together with particles of the first flowable material) achieve characteristics required by a particular spraying application by the time they reach the opening 34 of anode 8. The sum of lengths of portions 160 and 162 is selected so that particles of the first flowable material achieve characteristics required by the particular spraying application by the time they reach opening 34 of anode 8. Note that particles of the first flowable material are heated in portion 160, then they are cooled in the area where feeder 128 connects to the plasma channel 26, and then they are heated again (together with the particles of the second flowable material) in portion 162. The length of portion 160 can be determined from the total sum of lengths of portions 160 and 162 and the length of portion 162. In embodiments with more than two flowable materials injectors, the lengths of various portions may be determined in the same manner.

The device of the invention may be used for applications other than coating by plasma spraying. For example, one possible application is Plasma Enhanced Chemical Vapor Deposition (PECVD). Briefly, Chemical Vapor Deposition (CVD) is a method of deposition of thin films, in which particles are heated and propelled towards the surface to be coated, and as a result of their high energy a chemical reaction occurs on the surface to be coated and a film is formed. One application for which CVD is used is deposition of diamond films. To achieve the deposition of a diamond film on the surface, the conditions required for the growth of a diamond have to be created on the surface. Plasma generating devices can be used to create such conditions. Argon plasma, for example, sustains the temperature of 10,000° K. or above. At this temperature, hydrogen and some hydrocarbon are decomposed into atomic hydrogen and atomic carbon. The plasma flow accelerates atomic hydrogen and atomic carbon toward the surface, on which the atomic carbon (in the presence of certain precursors) begins to form the diamond film. Using the embodiment with a single flowable material injector separates hydrocarbon and hydrogen from the cathode, thus preventing the cathode erosion, and at the same time ensures that the two gases spend enough time in the heated plasma to completely decompose into the elemental particles.

An important factor in CVD is the thickness of the layer in which the diamond grows, called a boundary layer. The thickness of the boundary layer determines the rate of the diamond film growth, and ideally it should be as thin as possible. The thickness of the layer is inversely proportional to the square root of the velocity of the plasma flow that is used to deliver the elemental particles. Accelerating the plasma with a throttling portion to supersonic speeds, therefore, facilitates the formation of a thinner boundary layer.

Embodiments of the device of the invention may also be used for destruction of hazardous materials or waste in solid, liquid and gaseous forms. For example, an embodiment of the plasma generating device may be integrated in a waste management system or a motor vehicle exhaust system. At high temperatures, the organic materials are pyrolysed. Then, in the cooler sections of the system the elemental particles and ions may recombine prior to rapid alkaline quench to form simple molecules. The resulting end products include gases consisting of argon, carbon dioxide and water vapor and aqueous solutions of inorganic sodium salts.

It is also possible to combine the function of destruction hazardous materials and waste with CVD. For example, when using an embodiment of the device, the destruction chamber may include a substrate holder where the diamonds can be grown from the elemental carbon.

Embodiments of the device with multiple flowable material injectors enable the use of the device in applications for which the embodiments of the device with a single flowable material are not suitable.

For some coating applications, such as for example thermal barrier coating (TBC) used to coat turbine parts, it is necessary to have two layers of coating: the top coat and the bond coat. The bond layer is necessary due to a mismatch of thermal expansion coefficients of the coated metal and the top coat, which is typically ceramic. The bond coat is applied first to the metallic surface to be coated. The bond coat serves as an adhesive layer between the top coat and the metallic surface. For better adhesion as well as for producing a thicker coating, a method known as Graded Functional Coating is used. With Graded Functional Coating, two powders are injected into the plasma flow. However, the relative amounts of the injected powders vary with time. In the beginning of the coating process, only the powder used to form the bond coat is injected. Gradually, the fraction of the powder used to form the top coat is increased, while the fraction of the powder used to form the bond coat is decreased. Finally, only the powder used to form the top coat is supplied. The powders used for the formation of the two coats have very different characteristics, such as particle size, melting point, etc. Using the embodiment of the device with a single flowable material injector would require optimizing the parameters of the device for two different powders. Even if satisfactory parameters are found, the performance of such device would not be optimal.

Using the device with multiple flowable material injectors enables creation of a device that accomplishes optimal conditions for spraying both powders. Turning, for example, to the embodiment of the device shown in FIG. 5, the powder used to form the top ceramic layer has a higher melting point than the powder used to form the bond layer. Accordingly, the powder used to form the top layer is supplied to the upstream flowable material injector through the inlets 94 and 95. The powder used to form the bond coat is supplied to the downstream flowable material injector through the inlets 124 and 125. The lengths of the respective portions 160 and 162 may be configured to ensure that both powders spend optimal time in the plasma channel 26 before exiting from the outlet 34 of anode 8 and then exit the device from outlet 34 at optimal temperature.

The foregoing description of the embodiments of the present invention has been presented for purposes of illustration and description. It is not intended to be exhaustive nor to limit the invention to the precise form disclosed. Many modifications and variations will be apparent to those skilled in the art. The embodiments were chosen and described in order to best explain the principles of the invention and its practical applications, thereby enabling others skilled in the art to understand the invention. Various embodiments and modifications that are suited to a particular use are contemplated. It is intended that the scope of the invention be defined by the accompanying claims and their equivalents.

What is claimed is:

1. A plasma generating device comprising:
   a. an anode;
   b. a cathode;
   c. a plasma channel, extending longitudinally from a location between said cathode and said anode through a distal end of said anode, and having an outlet opening at the anode end, a part of the plasma channel being formed by two or more intermediate electrodes electrically insulated from each other and said anode; the plasma channel having a throttling portion formed by one of the two or more intermediate electrodes, the throttling portion dividing the plasma channel into:
      i. a high pressure portion positioned on the side of the throttling portion closest to the cathode, the high pressure portion being formed by at least one of the intermediate electrodes distinct from the intermediate electrode forming said throttling portion, and
      ii. a low pressure portion positioned on the side of the throttling portion closest to the anode; and
   d. one or more flowable material injectors, each comprising a flowable material feeder having an opening into the low pressure portion of the plasma channel between the throttling portion and the anode,
   wherein the throttling portion has a throat, the throat having a cross sectional area transverse to the longitudinal direction of the plasma channel, the cross sectional area being smaller than (1) the minimum cross sectional area of the high pressure portion transverse to the longitudinal direction of the plasma channel and (2) the minimum cross sectional area of the low pressure portion transverse to the longitudinal direction of the plasma channel, and
   wherein the throttling portion is capable of, upstream of the throat, increasing a velocity and decreasing a static pressure of a plasma flow passing through the plasma channel and, downstream of the throat, of further increasing the velocity and further decreasing the static pressure of the plasma flow.

2. The plasma generating device of claim 1, wherein the high pressure portion is formed by two or more intermediate electrodes distinct from the intermediate electrode forming said throttling portion.

3. The plasma generating device of claim 1, wherein the low pressure portion is formed by one or more intermediate electrodes.

4. The plasma generating device of claim 2, wherein the low pressure portion is formed by two or more intermediate electrodes.

5. The plasma generating device of claim 3, wherein the throttling portion is a supersonic nozzle.

6. The plasma generating device of claim 3, wherein the minimum cross sectional area of the high pressure portion transverse to the longitudinal direction of the plasma channel is smaller than or equal to the minimum cross sectional area of the low pressure portion transverse to the longitudinal direction of the plasma channel.

7. The plasma generating device of claim 3, wherein the low pressure portion is formed by an intermediate electrode distinct from the intermediate electrode forming said throttling portion.

8. The plasma generating device of claim 7 further comprising means for cooling the anode.

9. The plasma generating device of claim 8 further comprising means for cooling the intermediate electrode forming the throttling portion separate from the means for cooling the anode.

10. The plasma generating device of claim 3, wherein each of the flowable material feeders has one of the following orientations: (a) perpendicular to the longitudinal direction of the plasma channel, (b) angled toward the anode, and (c) angled away from the anode.

11. The plasma generating device of claim 3, wherein a portion of the plasma channel between any pair of adjacent feeders is formed by two or more intermediate electrodes.

12. The plasma generating device of claim 1, wherein the one or more flowable material injectors further comprise a flowable material chamber having an inlet.

13. A method of plasma-spraying one or more flowable materials with a device having a channel with a throttling portion dividing the channel into (1) a high pressure portion positioned upstream of the throttling portion and (2) a low pressure portion positioned downstream of the throttling portion, the throttling portion having a throat, the throat having a cross sectional area transverse to the longitudinal direction of the channel, the cross sectional area being smaller than (1) the minimum cross sectional area of the high pressure portion transverse to the longitudinal direction of the channel and (2) the minimum cross sectional area of the low pressure portion transverse to the longitudinal direction of the channel, the throttling portion is capable of, upstream of the throat, increasing a velocity and decreasing a static pressure of a plasma flow passing through the channel and, downstream of the throat, of further increasing the velocity and further decreasing the static pressure of the plasma flow, the method comprising:
  a. heating at least a part of a plasma in a flow in the channel upstream of the throttling portion;
  b. passing the plasma through the throttling portion of the channel;
  c. injecting one or more flowable materials into the flow of plasma through one or more flowable material inlets in the channel downstream of the throttling portion; and
  d. heating the particles of all flowable materials in the flow by heating at least a part of the plasma in the flow downstream of each of the one or more flowable material inlets in the channel.

14. The method of claim 13, wherein passing the plasma through the throttling portion further comprises increasing the speed of the plasma in the flow to supersonic speed.

15. The method of claim 13, further comprising outputting the resultant heated particles and plasma.

16. The method of claim 13, wherein the step of heating the particles is performed until at least some particles of at least one flowable material reach a predetermined temperature.

17. The method of claim 13, wherein during the step of injecting, the injection rate of at least one flowable material that is injected is varied over time.

18. The method of claim 13, wherein at least one of the flowable materials is a nanoparticle precursor solution.

19. The method of claim 13, wherein at least one of the flowable materials is a mixture of hydrogen and a hydrocarbon.

20. The method of claim 13, wherein at least one of the flowable materials is one of: (a) waste to be destroyed and (b) hazardous material.

21. The method of claim 13, wherein the part of the plasma in the flow is heated to least 10,000° K.

22. The method of claim 21, wherein heating at least the part of the plasma in the flow to at least 10,000° K is accomplished by maintaining an electric arc in the channel.

23. The method of claim 22, wherein heating the particles of all flowable materials in the flow by heating at least a part of the plasma in the flow is accomplished by maintaining the electric arc in the channel.

24. The method of claim 20 further comprising, for at least one flowable material, decomposing the flowable material into a mixture comprising elemental carbon.

25. The method of claim 13, wherein passing the plasma through the throttling portion of the channel results in increasing velocity pressure of the heated plasma in the flow, decreasing the static pressure of the heated plasma in the flow.

* * * * *